United States Patent [19]
Windsor et al.

[11] 3,741,261
[45] June 26, 1973

[54] WIRE TERMINATING APPARATUS

[75] Inventors: Meredith M. Windsor, Elk Rapids; Ronald D. Heller, Traverse City, both of Mich.

[73] Assignee: D-D-D Engineering & Service Corp., Elk Rapids, Mich.

[22] Filed: Oct. 8, 1971

[21] Appl. No.: 187,651

[52] U.S. Cl. .................... 140/1, 29/203 T, 81/9.51
[51] Int. Cl. ............................................. B21f 21/00
[58] Field of Search ...................... 140/1; 81/9.51; 29/203 T; 269/152

[56] References Cited
UNITED STATES PATENTS
2,886,995   5/1959   Bach et al. ........................... 81/9.51

*Primary Examiner*—Lowell A. Larson
*Attorney*—Olsen & Stephenson

[57] ABSTRACT

An apparatus for delivering an insulated wire to a clamping station, measuring a predetermined length, and then cutting and stripping the wire. The apparatus facilitates the manufacture of wire harnesses and the like by providing for automatic measurement of a wire, cutting the wire and then stripping the wire on both sides of the resultant cut, and delivery of the cut pieces to clamps on a conveyor for further processing.

9 Claims, 8 Drawing Figures

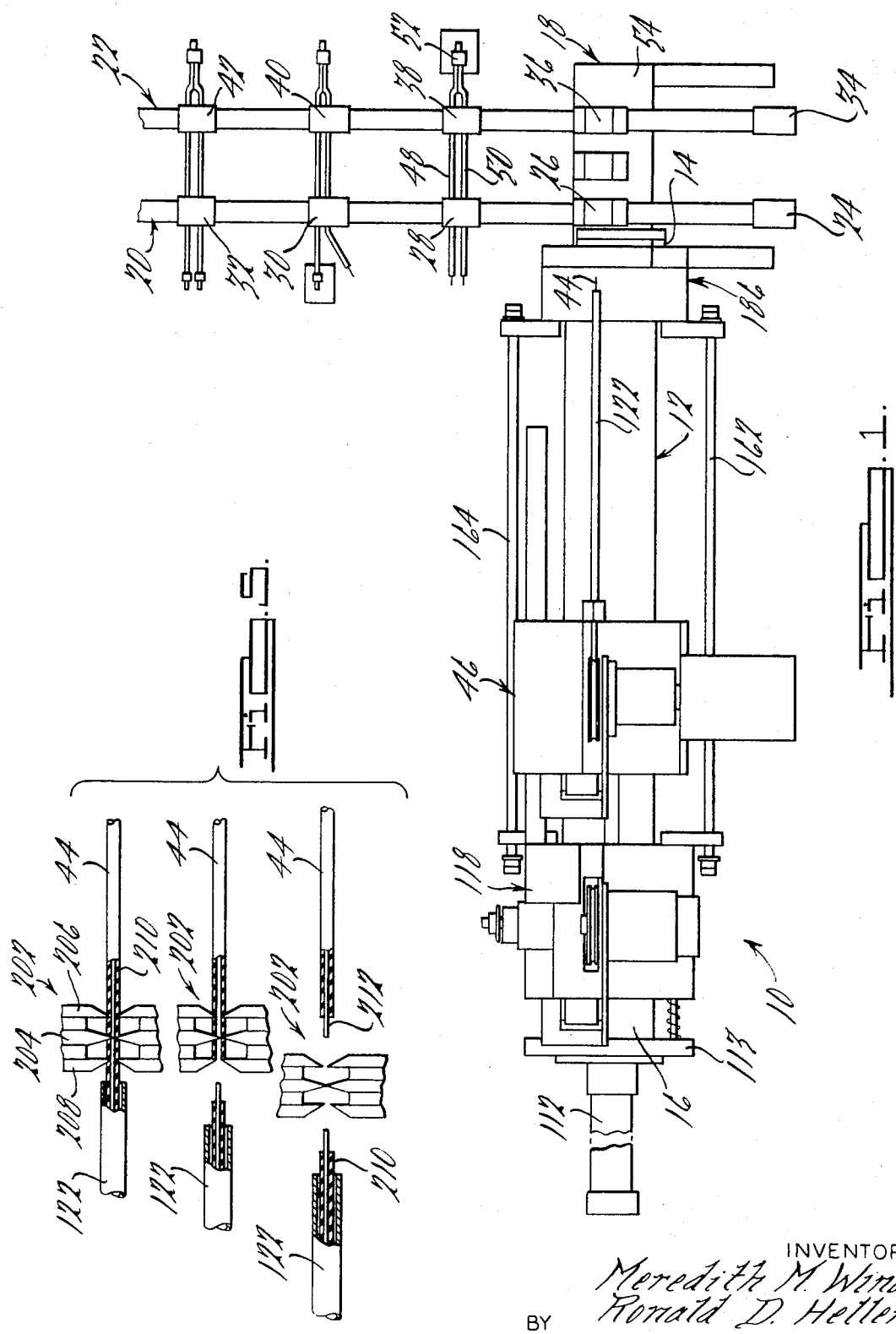

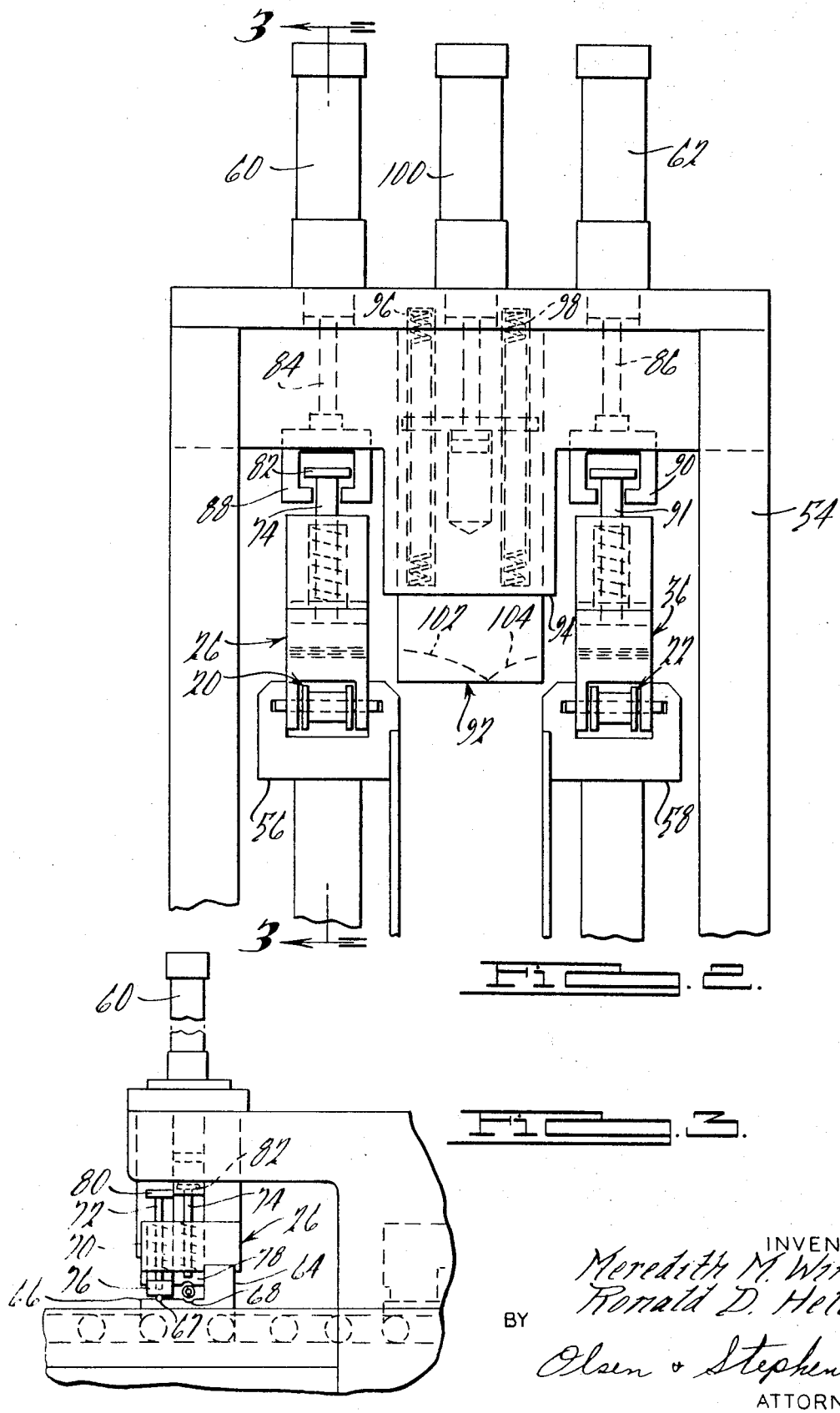

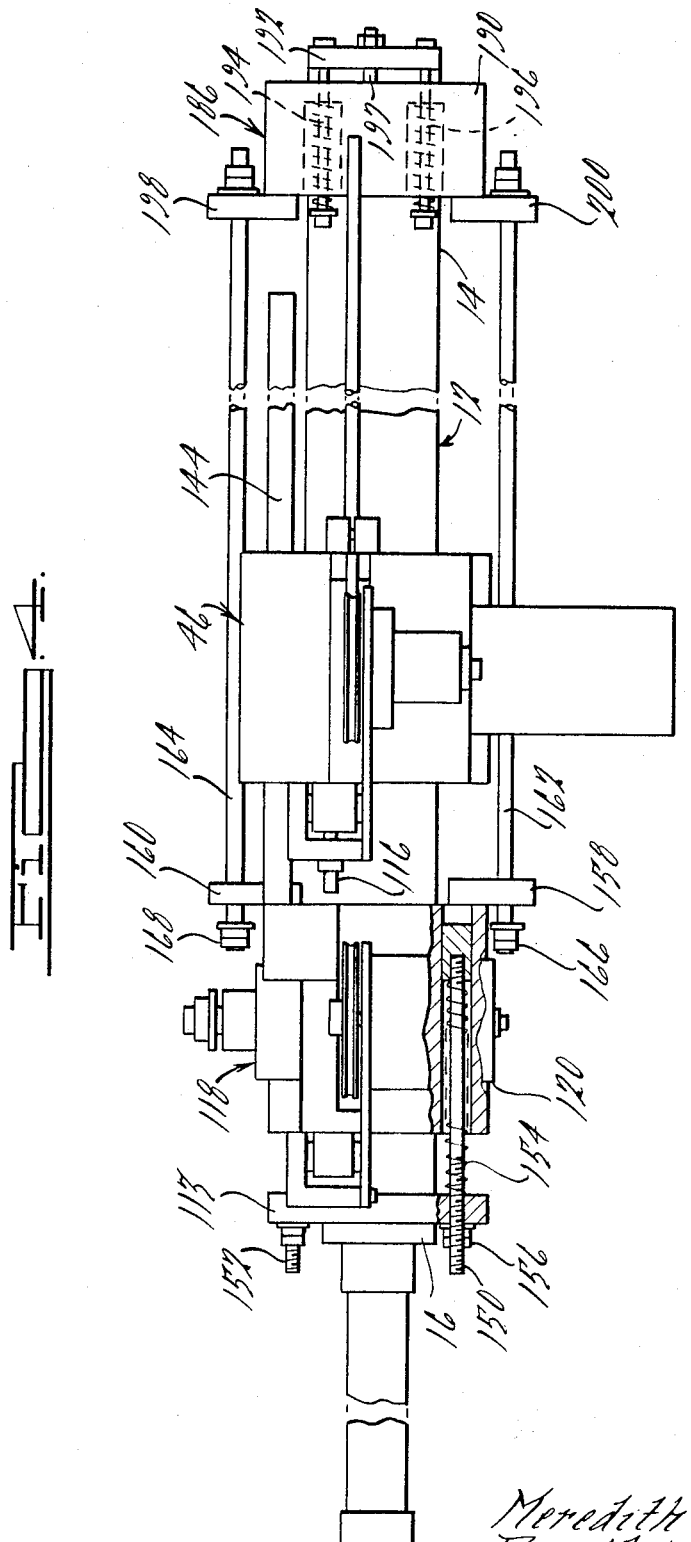

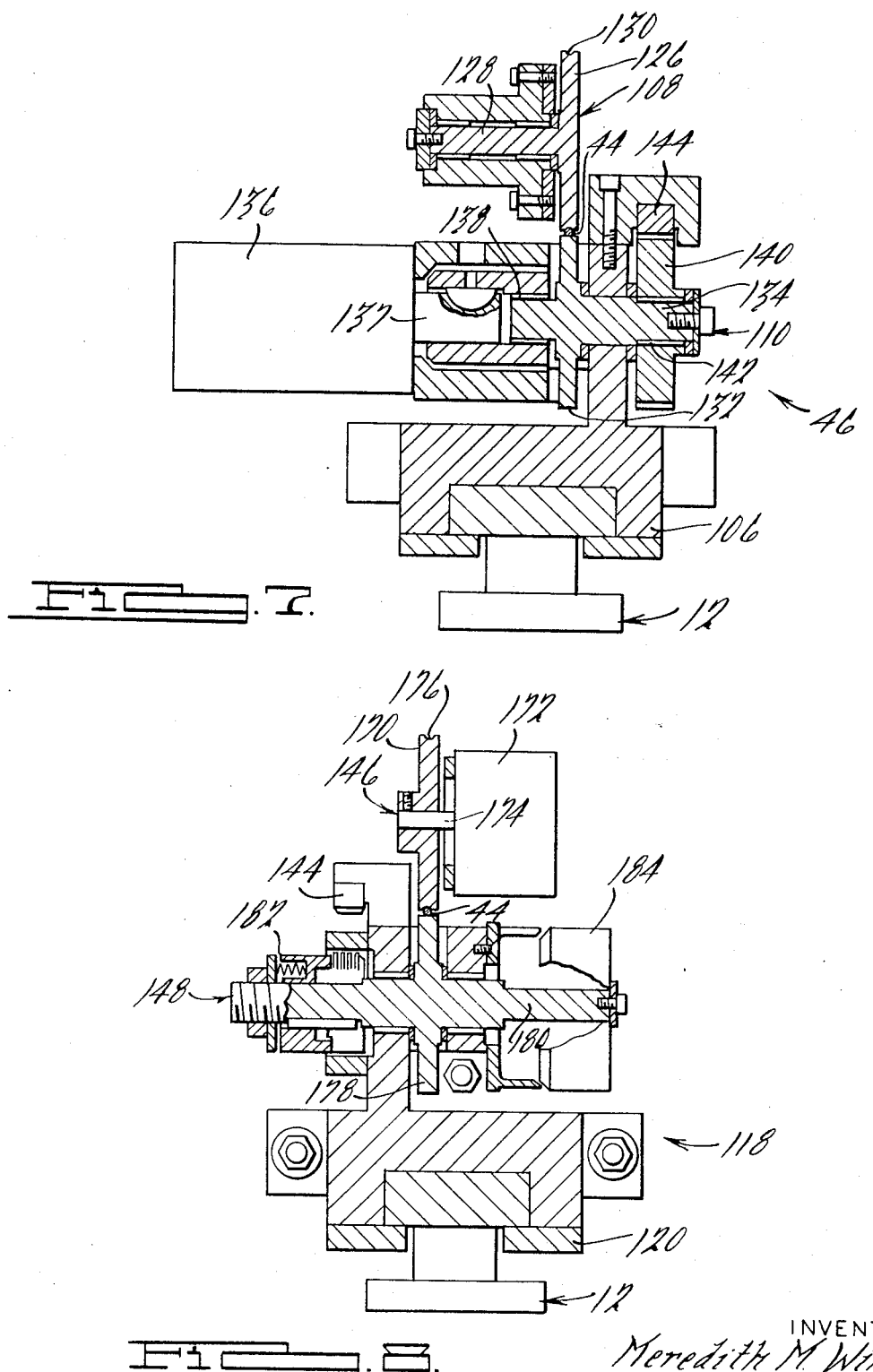

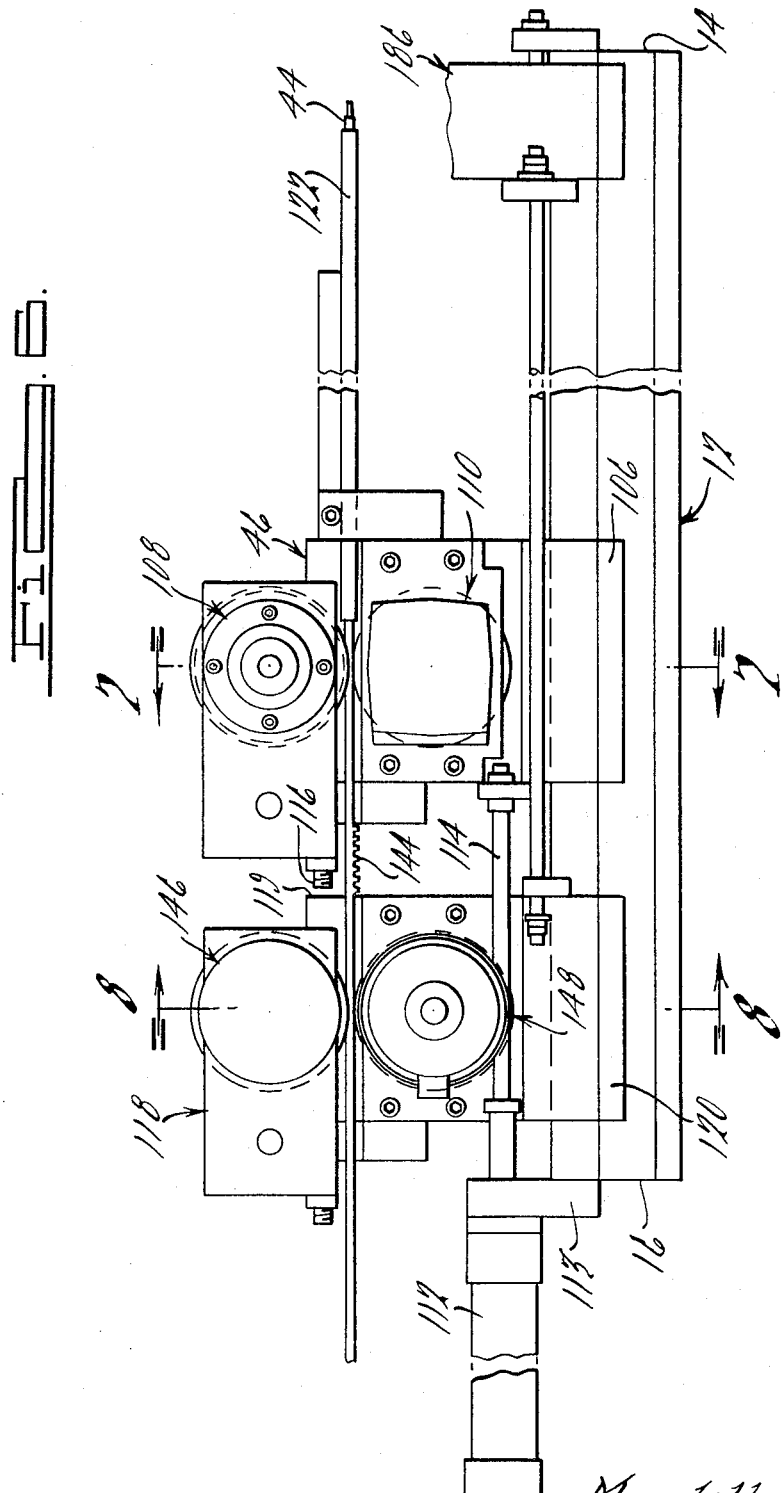

3,741,261

WIRE TERMINATING APPARATUS

BACKGROUND OF THE INVENTION

In the manufacture of electrical wiring harnesses and the like, the first step requires that the various wires in the harness be cut to a predetermined length then stripped of insulation near the ends so that terminals may be attached to each end by crimping, for example. The number of wires in a harness may vary and each wire may be of a different length. The apparatus necessary to perform the measuring, cutting, and stripping operation ideally should employ several features. It should deliver the cut and stripped pieces of wire regardless of length to a conveyor so that the stripped ends are firmly held and uniformly positioned with respect to the conveyor to accommodate the next automated process such as crimping on terminals. The cut should be made while the wire is not moving to insure accuracy of cutting and stripping. The apparatus should have a minimum number of sequential operations and employ analog to digital measuring devices so that the process can be simply programmed for computer control. The present invention provides all these advantages for the automatic cutting and stripping of variable lengths of insulated wire.

SUMMARY OF THE INVENTION

The invention comprises a conveyor assembly at one end of a rail with clamps mounted thereon, a wire delivery assembly slidably mounted on the rail which delivers the end of an insulated wire through one clamp and into a second clamp where it is secured, a measurement assembly slidably mounted on the rail near the other end of the rail for determining when the proper length of wire has been delivered through the first clamp, and a cutter and stripper which is activated by the measurement assembly in conjunction with the halting of the feeding of wire and the closing of the first clamp. The wire delivery assembly advances along the rail toward the clamps and delivers the wire through a tube. Once the second clamp has secured the end portion of the wire, the delivery assembly partially retracts until it just contacts the measurement assembly which has also advanced slightly behind the delivery assembly in response to the urging of a spring. The wire is then fed through the still opened first clamp by the delivery assembly until the measurement assembly records the proper length. When the proper length has been delivered, the wire delivery assembly stops, the wire measurement assembly clamps the wire, the first clamp closes clamping the wire, and the cutter and stripper engages the wire. The wire delivery assembly then fully retracts carrying the wire measurement assembly with it. During the first portion of the final retraction the wire portion secured by the wire measurement assembly is pulled free from the stripper thereby stripping the end nearest the wire delivery and wire measurement assemblies. During the last portion of the final retraction the wire measurement assembly engages the slidably mounted cutter and stripper and pulls it along. This causes the wire portion held by the first clamp to be pulled free of the cutter and stripper and thus stripped. The cutter and stripper returns to its wire engaging position under the influence of a spring when the wire delivery and wire measurement assemblies next advance.

Other objects of this invention will appear in the following description and appended claims, reference being had to the accompanying drawings forming a part of this specification wherein like reference characters designate corresponding parts in the several views.

FIG. 1 is a top plan view of the wire termination apparatus of this invention;

FIG. 2 is a side elevational view of the clamping station which is a part of the invention;

FIG. 3 is a side sectional view of the clamping station as seen along line 3—3 of FIG. 2;

FIG. 4 is a shortened plan view of the portion of the wire termination apparatus with cutaway portions to reveal internal detail;

FIG. 5 is a partial side elevational view showing the sequential steps for cutting and stripping a wire;

FIG. 6 is a shortened side elevational view of a portion of the wire termination apparatus;

FIG. 7 is a sectional view of the wire delivery assembly as seen along line 7—7 of FIG. 6; and FIG. 8 is a sectional view of the wire measurement assembly as seen along line 8—8 of FIG. 6.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Referring to the drawings, apparatus for cutting and stripping insulated wire according to this invention, indicated generally at 10, is shown in FIG. 1 as including a rail 12 having a front end 14 and a rear end 16. Clamping station 18 is rigidly attached to the rail 12 at end 14. Conveyors 20 and 22, with double clamps 24, 26, 28, 30 and 32 attached to conveyor 20 and double clamps 34, 36, 38, 40 and 42 attached to conveyor 22, pass the clamping station 18 where an insulated wire 44 is delivered by wire delivery assembly 46 through clamp 26 and into clamp 36. After two wires have been delivered to each half of both double clamps 26 and 36 and the wires have been cut off, the conveyors 20 and 22 move forward to bring clamps 24 and 34 into alignment with the clamp station 18. In FIG. 1, clamps 28 and 38 have passed the clamp station 18 and are carrying wire lengths 48 and 50 which have been properly terminated and are ready to receive a terminal 52. The wire lengths 48 and 50 are delivered to and held in the clamps 28 and 38 so that the ends uniformly extend from the clamps 28 and 38 regardless of the length of the wires 48 and 50.

The clamping station 18 comprises an arch-shaped base 54 (FIGS. 1 and 2). The conveyors 20 and 22 pass beneath the arch-shaped base 54 on supports 56 and 58. Double clamps 26 and 36 are mounted on the respective conveyors 20 and 22 and are positioned by the conveyors in alignment with clamp activators 60 and 62 which are mounted on the top of the arch-shaped base 54.

The double clamp 26 shown in FIG. 3 has a base 64 comprising a lower portion 66 secured to conveyor 20 with wire receiving grooves 67 and 68 and an upper base portion 70 having plungers 72 and 74 extending therethrough. The plungers 72 and 74 respectively have die sections 76 and 78 attached to their lower ends to mate with the grooves 67 and 68 respectively and flange portions 80 and 82 attached to their upper ends and are spring loaded to normally engage the grooves 67 and 68 by means of the dies 76 and 78 in a closed wire clamping configuration.

The clamp activators 60 and 62 (FIG. 2) are hydraulic cylinders with pistons 84 and 86 having channel-shaped grippers 88 and 90 attached. When the piston 84 is extended as shown in FIG. 2, the plunger 74 with its flange 82 can laterally pass into and through the channel-shaped gripper 88. When the plunger 74 and piston 84 are aligned and the piston 84 is retracted, the attached gripper 88 engages the flange 82 causing the plunger 74 and attached die section 78 to be raised against the spring loading thereby opening the clamp 26 as shown in FIG. 3. Clamp activator 62 can likewise engage plunger 91 of clamp 36 to open the clamp.

A wire deflector 92, mounted on the arch-shaped base 54 within a housing 94 and between the clamp activators 60 and 62, has springs 96 and 98 connected to the housing 94 so as to urge the deflector 92 downward. A hydraulic cylinder 100 is attached to the deflector 92 to retract it upward. The deflector has baffle surfaces 102 and 104 which assure that wire clamped in clamp 36 and being fed at high speed through open clamp 36 will not "hump" upward beyond the constrains of the baffle surfaces 102 and 104. The deflector 92 is then withdrawn after feeding so that delivery of wire to clamp 36 can again be accomplished.

With reference to FIGS. 1, 6 and 7, the wire 44 is deliveried to the clamping station 18 by the wire delivery assembly 46 which includes a structural base 106 slidably mounted on the rail 12 and having rotary members 108 and 110 mounted for rotation thereon. A hydraulic cylinder 112, mounted on a stop bracket 113 which is fixed to the rail 12 at the rear end portion 16 has its piston 114 attached to the base 106 and advances the wire delivery assembly 46 toward the front end portion 14 of the slide 12 and retracts the same toward the rear end portion 16. An adjustable contact point 116 is mounted on the structural base 106 and mates with a wire measurement assembly 118 at point 119 on its slidably mounted base 120 and causes the wire measurement assembly 118 to travel in conjunction with the wire delivery assembly 46 as the wire delivery assembly 46 is retracted toward the rear end portion 16 of the rail 12. A rigid, hollow tube 122 is attached at its one end to the structural base 106 and extends in advance of the base 106 and parallel to the rail 12. The tube 122 lies on a line defined by the grooves in clamps 26 and 36.

The rotary member 108 is made up of an idler wheel 126 and a shaft 128 journaled on the base 106 (FIG. 7). The idler wheel 126 has a concave groove 130 around it circumference to hold the wire 44 against the wire engaging wheel 132 which is part of the rotary member 110. The rotary member 110 which is journaled on base 106 additionally comprises a shaft 134 with the wire engaging wheel 132 mounted thereon for rotation therewith. A hydraulic motor 136 with a drive shaft 137 is connected via an overriding clutch 138 to one end of the shaft 134. The motor 136 when in its static state is configured so that no rotation of motor shaft 137 will occur. The clutch 138 provides for free wheeling between the shaft 134 and the motor shaft 137 when a relative counterclockwise torque is applied and for engagement when a relative clockwise torque is applied. A pinion gear 140 is connected via an overriding clutch 142 to the other end of the shaft 134. The clutch 142 provides for free wheeling between the shaft 134 and the gear 140 when a relative clockwise torque is applied and for engagement when a relative counterclockwise torque is applied. The pinion gear 140 engages a gear rack 144 which is connected to the base 120 of the wire measurement means 118. The wire can thus be fed by the motor turning the wheel 132 or clamped by the motor's non-rotating static state holding the wheel 132 or fed by the pinion gear 140 turning the wheel 132.

With reference to FIGS. 1, 6 and 8, the wire measurement assembly 118 with slidable base 120 has rotary elements 146 and 148 mounted thereon for rotation. The base has locator pins 150 and 152 (FIG. 4) threaded therein and extending freely through holes on each side of the stop bracket 113. Taking pin 150 as illustrative, a compression spring 154 is mounted on the pin 150 and contacts the base 120 and the bracket 113 thus urging the base 120 away from the bracket 113 along the rail 12. A locking nut 156 is attached to the pin 150 beyond the bracket 113 and contacts the bracket when the base 120 slides forward at the urging of the spring thereby constraining the extent of the travel of the wire measurement assembly 118. The locator pin 152 is similarly configured. The base also has brackets 158 and 160 mounted thereon which slidably engage tie rods 162 and 164 respectively. The tie rods 162 and 164 being pulled toward the second end portion 16 of the rail 12 when the wire measurement assembly 118 retracts sufficiently to engage locking nuts 166 and 168 attached to the tie rods.

The rotary element 146 comprises a measuring wheel 170 connected to a digital pulse generator 172 via a shaft 174. The measuring wheel 170 has a concave groove 176 around its circumference for holding the wire 44 in contact with drag engaging wheel 178 which is part of the rotary element 148. The rotary element 148 additionally comprises a shaft 180 with the drag engaging wheel 178 mounted thereon for rotation therewith. Connected to one end of the shaft 180 is an adjustable drag mechanism 182. A remotely controlled brake 184 is connected to the other end of the shaft 180 so that when the brake 184 is set the wire 44 is conjunction between the wheels 170 and 178.

With reference to FIGS. 1, 4 and 5, a cutter and stripper 186 having a base 190 is slidably mounted on the rail 12 near the front end portion 14. The base 190 is attached to fixed bracket 192 by means of spring loaded pins 194 and 196. The springs are configured so as to urge the base 190 against bumper point 197 of the bracket 192. Brackets 198 and 200 are mounted on either side of the base 190 and engage tie rods 174 and 176 respectively so that when the wire measuring device 118 retracts sufficiently to engage the tie rods 162 and 164, the cutter and stripper 186 retracts in conjuntion therewith. A head 202 of the cutter and stripper 186 is shown in FIG. 5 and has fully closing, cutting shears 204 for cutting wire 44 and partially closing stripping jaws 206 and 208 for severing and gripping insulation 210 of the wire 44. FIG. 5 shows sequentially top to bottom how the head 202 engages the wire 44 to cut it, how the left hand portion of the wire 44 is pulled out and thus stripped, and how the head 202 moves to the left thus disengaging and stripping the right hand portion of the wire In operation, the wire terminating apparatus 10 is initially in its retracted position with the piston 114 retracted into the cylinder 112, the wire measurement assembly 118 is flush against the stop bracket 113, the wire delivery assembly 46 is in contact with the wire measurement means 118 at point 116, and the cutter and stripper 186 pulled by the tie rods 162 and 164 is slightly displaced from the bumper 197 of the bracket 192. In practice, the displacement between the cutter and stripper 186 and the bumper 197 of the bracket 192 will be slightly greater than the length of the stripped portion 212 of the wire 44 (FIG. 5). Once the conveyors 20 and 22 have brought the plungers 74 and 91 of clamps 26 and 36 respectively into alignment with clamp activators 60 and 62 and the deflector 92 has been raised by hydraulic cylinder 100, the wire terminating apparatus is set to begin a cycle.

First, both clamps 26 and 36 are opened by the activators 60 and 72.

Second, the wire delivery assembly 46 advances toward the clamping station 18, propelled by the hydraulic cylinder 112, until the wire 44 protruding from the tube 122 is positioned between the dies of the clamp 36. Simultaneously two other events transpire. The wire measurement assembly 118 advances under the influence of the spring 154, as the contact point 116 on wire delivery assembly 46 moves toward the clamp station, until the locator pins 150 and 152 halt the advancement. In practice the distance the wire measurement assembly moves is equal to twice the length of the initial displacement between the cutter and stripper 186 and the bumper 197 of the bracket 192. As the wire measurement assembly 118 advances to a point midway in its advance, tension in the tie rods 162 and 164 is released and the cutter and stripper 186 under the influence of spring loaded pins 194 and 196 is allowed to move into contact with the bumper 197 of the bracket 192. As the wire measurement assembly 118 completes the second half of its advance, the brackets 158 and 160 slide along tie rods 162 and 164 (FIG. 4).

During the advancement of wire delivery assembly 46, the brake 184 on the wire measurement assembly 118 is unlocked and the motor 136 is in its static non-rotatable or locked state. Since the motor shaft 137 (FIG. 7) is locked during the advancement and because the overriding clutch 138 is engaged for a clockwise relative torque between the motor shaft 137 and the shaft 134, the wire 44 is clamped between wire engaging wheel 132 and idler wheel 126 and is pulled along with the wire delivery assembly 46 as it advances. After the portion of the advancement during which the wire delivery assembly 46 and the wire measurement assembly 118 move together, the wire measurement assembly 118 is halted by the locator pins 150 and 152 and the wire delivery assembly 46 continues advancing. The resulting relative movement of the wire measurement assembly 118 and the wire delivery assembly 46 causes the gear rack 144 mounted on the base 120 of wire measurement assembly 118 to rotate the engaged pinion gear 140 mounted on shaft 134. The rotation thus caused produces a clockwise torque between the pinion gear 140 and the shaft 134 which results in free wheeling therebetween due to the overriding clutch 142.

Third, the clamp 36 closes on the wire 44 securely clamping it.

Fourth, the wire delivery assembly 46 is retracted by the hydraulic cylinder 112 until the contact point 116 just contacts the wire measurement assembly 118 at point 119 (FIG. 6). During retraction the rotation of the pinion gear 140 engaged by the rack 144 results in a counterclockwise torque between the pinion gear 140 and the shaft 134. The overriding clutch 142 is thus engaged and the wire engaging wheel 132 rolls back along the wire 44 as the overriding clutch 138 allows free wheeling between the locked motor shaft 137 and the shaft 134.

Fifth, the wire deflector 92 is lowered.

Sixth, the motor 136 is activated to feed wire through the open clamp 26 and form a loop of wire between and below the conveyors 20 and 22.

Seventh, when the pulse generator 172 has produced a digital signal corresponding to the predetermined wire length, the motor 136 stops, the brake 184 sets, and the clamp 26 closes.

Eighth, the head 202 engages the wire 44 as shown in the first step of FIG. 5. The wire deflector 92 is also retracted.

Ninth, the wire delivery assembly 46 retracts the rest of the distance carrying the wire measurement assembly 118 with it. During the first half of the final retraction the wire 44 clamped by the brake 184 is pulled out of the head 202 thus stripping the wire 44 to the left of the cut. The wire cutter and stripper 186 remains stationary as the brackets 158 and 160 on the wire measurement assembly 118 merely slide along the tie rods 162 and 164 toward engagement with locking nuts 166 and 168. During the second half of the retraction when the brackets 158 and 160 of the wire measurement assembly 118 have engaged the tie rods 162 and 164, the wire cutter and stripper 186 with head 202 attached is pulled away from the wire 44 to the right of the cut thus stripping the right hand portion of the wire 44. Once step nine is accomplished the wire termination apparatus 10 is ready for the conveyors 20 and 22 to advance and another cycle to begin.

What is claimed is:

1. Wire processing apparatus comprising substantially straight tube means arranged in a supporting relation with an end portion of a supply of insulated wire so that said wire projects from one end of said tube means and can be fed therethrough, first and second wire clamp units spaced apart in a direction substantially parallel to said tube means, wire delivery means arranged in a supporting relation with said tube means, said wire delivery means being operable to move said tube means to one position in which wire projecting therefrom can be clamped in said second clamp unit, said wire delivery means being operable to move said tube means to another position in which wire projecting therefrom can be clamped in said first clamp unit, and said wire delivery means being operable to feed said wire through said tube means so that a predetermined length of wire is disposed between said clamp units, and cutting means adjacent said first clamp unit for cutting said wire.

2. Wire processing apparatus according to claim 1 wherein said first and second clamp units are mounted on conveyor means extending substantially perpendicular to said tube means, and wire deflector means positioned between said clamp units and operable to deflect wire fed by said wire delivery means to a position below and between said clamp units.

3. Wire processing apparatus according to claim 1 wherein said wire delivery means comprises tube driving means for moving said tube means from a retracted position to a first position adjacent said second clamp unit and then to a position adjacent said first clamp unit, wire driving means for feeding said wire through said tube means, and wire measurement means for measuring a predetermined length of said wire.

4. Wire processing apparatus according to claim 3 wherein said wire driving means comprises first and second coacting rotary members engaging said wire therebetween, said first rotary member being configured for rotation along said wire, and motor means drivingly connected to said second rotary member for driving said wire through said tube means.

5. Wire processing apparatus according to claim 4 wherein wire driving means is mounted on said tube driving means, said tube driving means being disposed for linear relative movement with respect to said wire measurement means in a direction essentially parallel to said tube means.

6. Wire processing apparatus according to claim 5 wherein said wire delivery means comprises gear rack means mounted on said measurement means and extending in a direction essentially parallel to said tube means, and gear means drivingly connected to said second rotary member of said wire driving means and in mesh with said gear rack means, said gear being adapted for unidirectional rotational driving of said second rotary member and said motor means being adapted for opposite unidirectional rotational driving of said second rotary member.

7. Wire processing apparatus according to claim 3 wherein said measurement means comprises first and second coacting rotary members engaging said wire therebetween, rotational counter means connected to said first rotary member and operable to measure said predetermined length of wire and rotational drag and braking means connected to said second rotary member providing for clamping of said wire between said members when said predetermined length has been measured.

8. Wire processing apparatus according to claim 1 wherein said cutting means comprises cutting shear means and partially closing stripping jaw means spaced on each side of said cutting shear means and operable to cut through insulation on said wire and hold said insulation firmly while said wire is pulled therefrom.

9. In wire processing apparatus which includes clamp means for holding a length of insulated wire received from a supply of insulated wire, means for severing said length from said supply and stripping the insulation from one end of said length and the adjacent end of the supply, said means comprising shear members operable to sever said wire, pairs of cutting members disposed on opposite sides of and adjacent said shear members for cutting through said insulation at positions spaced from said ends, and means providing first for movement of the end of said supply away from said cutting members so as to strip insulation therefrom and subsequently providing for movement of said cutting members away from said one end of said length so as to strip insulation therefrom. and gripping insulation 210 of the wire 44. FIG. 5 shows sequentially top to

* * * * *

PO-1050
(5/69)

UNITED STATES PATENT OFFICE
CERTIFICATE OF CORRECTION

Patent No. 3,741,261  Dated June 26, 1973

Inventor(s) Meredith M. Windsor et al

It is certified that error appears in the above-identified patent and that said Letters Patent are hereby corrected as shown below:

Col. 3, line 34, "deliveried" should be -- delivered --;

line 58, "it" should be -- its --.

Col. 4, lines 49 and 50 - cancel "conjunction" and insert
-- clamped --.

Col. 8, line 33, after the period, cancel "and gripping insulation 210 of the wire 44";

cancel line 34.

Signed and sealed this 17th day of September 1974.

(SEAL)
Attest:

McCOY M. GIBSON JR.
Attesting Officer

C. MARSHALL DANN
Commissioner of Patents